(12) United States Patent
Cho et al.

(10) Patent No.: US 8,606,735 B2
(45) Date of Patent: Dec. 10, 2013

(54) APPARATUS AND METHOD FOR PREDICTING USER'S INTENTION BASED ON MULTIMODAL INFORMATION

(75) Inventors: Jeong-Mi Cho, Suwon-si (KR); Jeong-Su Kim, Yongin-si (KR); Won-Chul Bang, Seongnam-si (KR); Nam-Hoon Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 597 days.

(21) Appl. No.: 12/770,168

(22) Filed: Apr. 29, 2010

(65) Prior Publication Data
US 2010/0280983 A1   Nov. 4, 2010

(30) Foreign Application Priority Data

| Apr. 30, 2009 | (KR) | ........................ 10-2009-0038267 |
| Jul. 22, 2009 | (KR) | ........................ 10-2009-0067034 |
| Apr. 19, 2010 | (KR) | ........................ 10-2010-0036031 |

(51) Int. Cl.
*G06F 17/00* (2006.01)
*G06F 3/048* (2013.01)

(52) U.S. Cl.
USPC ............................................ 706/46; 715/767

(58) Field of Classification Search
None
See application file for complete search history.

(56) References Cited

U.S. PATENT DOCUMENTS

| 5,426,745 | A | * | 6/1995 | Baji et al. ....................... 345/469 |
| 5,473,726 | A | * | 12/1995 | Marshall ....................... 704/231 |
| 5,621,858 | A | * | 4/1997 | Stork et al. ..................... 704/232 |
| 5,806,036 | A | * | 9/1998 | Stork ............................. 704/260 |
| 6,396,954 | B1 | * | 5/2002 | Kondo .......................... 382/224 |
| 6,549,231 | B1 | * | 4/2003 | Matsui ............................ 348/61 |
| 6,629,065 | B1 | * | 9/2003 | Gadh et al. ....................... 703/1 |
| 6,825,875 | B1 | * | 11/2004 | Strub et al. ............... 348/207.99 |
| 6,842,877 | B2 | * | 1/2005 | Robarts et al. ................ 715/708 |
| 6,964,023 | B2 | * | 11/2005 | Maes et al. ..................... 715/811 |
| 7,028,269 | B1 | * | 4/2006 | Cohen-Solal et al. ........ 715/863 |
| 7,089,217 | B2 | * | 8/2006 | Kasabov .......................... 706/12 |
| 7,102,485 | B2 | * | 9/2006 | Williams ........................ 340/3.3 |
| 7,171,357 | B2 |   | 1/2007 | Boland |
| 7,203,643 | B2 |   | 4/2007 | Garudadri |
| 7,230,955 | B1 |   | 6/2007 | James et al. |
| 7,302,388 | B2 |   | 11/2007 | Zhang et al. |

(Continued)

FOREIGN PATENT DOCUMENTS

| JP | 08-234789 | 9/1996 |
| JP | 2000-276190 | 10/2000 |

(Continued)

OTHER PUBLICATIONS

Igarashi et al, Voice as Sound: Using Non-verbal Voice Input for Interactive Control, Nov. 2001.*

(Continued)

*Primary Examiner* — Jeffrey A Gaffin
*Assistant Examiner* — Mikayla Chubb
(74) *Attorney, Agent, or Firm* — NSIP Law (57) ABSTRACT

Disclosed are an apparatus and method of deducing a user's intention using multimodal information. The user's intention deduction apparatus includes a first predictor to predict a part of a user's intention using at least one piece of motion information, and a second predictor to predict the user's intention using the predicted part of the user's intention and multimodal information received from at least one multimodal sensor.

19 Claims, 7 Drawing Sheets

(56) References Cited

U.S. PATENT DOCUMENTS

| | | | |
|---|---|---|---|
| 7,318,030 | B2 | 1/2008 | Guduru |
| 7,343,289 | B2 | 3/2008 | Cutler et al. |
| 7,346,502 | B2 | 3/2008 | Gao et al. |
| 7,346,504 | B2 | 3/2008 | Liu et al. |
| 7,383,181 | B2 | 6/2008 | Huang et al. |
| 2003/0046087 | A1 | 3/2003 | Johnston et al. |
| 2003/0055655 | A1 | 3/2003 | Suominen |
| 2004/0243416 | A1 | 12/2004 | Gardos |
| 2005/0228673 | A1 | 10/2005 | Nefian et al. |
| 2005/0257174 | A1* | 11/2005 | Wilson .......................... 715/863 |
| 2005/0267745 | A1 | 12/2005 | Laaksonen et al. |
| 2005/0268247 | A1* | 12/2005 | Baneth .......................... 715/781 |
| 2006/0053007 | A1 | 3/2006 | Niemisto |
| 2006/0107824 | A1 | 5/2006 | Bando et al. |
| 2006/0253283 | A1 | 11/2006 | Jabloun |
| 2007/0005363 | A1 | 1/2007 | Cucerzan et al. |
| 2007/0136071 | A1 | 6/2007 | Lee et al. |
| 2008/0040109 | A1 | 2/2008 | Muralidhar et al. |
| 2008/0255842 | A1 | 10/2008 | Simhi |
| 2009/0182560 | A1* | 7/2009 | White .......................... 704/235 |
| 2009/0327977 | A1* | 12/2009 | Bachfischer et al. ......... 715/863 |
| 2010/0162181 | A1 | 6/2010 | Shiplacoff et al. |

FOREIGN PATENT DOCUMENTS

| | | |
|---|---|---|
| JP | 2001-100878 | 4/2001 |
| KR | 10-2002-0068235 | 8/2002 |
| KR | 10-2004-0072286 A | 8/2004 |
| KR | 10-2007-0004017 | 1/2007 |
| KR | 10-2007-0061207 | 6/2007 |
| KR | 10-2008-0002187 A | 1/2008 |
| WO | WO-2009/045861 A1 | 4/2009 |

OTHER PUBLICATIONS

Bilmes et al, The Vocal Joystick: A Voice-based Human-Computer Interface for Individuals with Motor Impairments, Oct. 2005, Proceedings of HLT/EMNLP pp. 995-1002.* van de Pol et al, Interaction in Semi-Immersive Large Display Environments, 1998.*

International Search Report issued on Dec. 7, 2010, in counterpart International Application No. PCT/KR2010/002723 (5 pages including English translation).

Ko, Kwang-Eun, et al., "Development of Context Awareness and Service Reasoning Technique for Handicapped People," Korea Intelligent Information Systems Society Journal, Feb. 2009, pp. 34-39, vol. 19, No. 1 (6 pages including an English abstract).

Almajai et al., "Using Audio-Visual Features for Robust Voice Activity Detection in Clean and Noisy Speech," In *Proceedings of the 16th European Signal Processing Conference (EUSIPCO 2008)*, Aug. 25-29, 2008, Lausanne, Switzerland, pp. 1-5.

Libal et al., "An Embedded System for In-Vehicle Visual Speech Activity Detection," In *Proceedings of the IEEE 9th Workshop on Multimedia Signal Processing*, Oct. 1-3, 2007, pp. 255-258.

Sodoyer et al., "An Analysis of Visual Speech Information Applied to Voice Activity Detection," In *Proceedings of the 2006 IEEE International Conference on Acoustics, Speech and Signal Processing (ICASSP 2006)*, May 14-19, 2006, vol. 1, pp. 1-4.

Extended European Search Report mailed Oct. 17, 2012, issued in counterpart European Patent Application No. 10 769 966.2; 6 pages in English language.

* cited by examiner

APPARATUS AND METHOD FOR PREDICTING USER'S INTENTION BASED ON MULTIMODAL INFORMATION

CROSS-REFERENCE TO RELATED APPLICATION

This application claims the benefit under 35 U.S.C. §119 (a) of Korean Patent Applications No. 10-2009-0038267, filed on Apr. 30, 2009, No. 10-2009-0067034, filed on Jul. 22, 2009, and No. 10-2010-0036031, filed on Apr. 19, 2010, the disclosure of each of which is incorporated by reference in its entirety for all purposes.

BACKGROUND

1. Field

The following description relates to a system using multimodal information, and more particularly, to an apparatus and method for processing a user's input using multimodal information.

2. Description of the Related Art

A multimodal interface allows persons to interface with machines through voice, a keyboard, a pen, etc. for communication therebetween. In analyzing a user's intention using multimodal information inputted through such a multimodal interface, there are various methods such as a method of combining multimodal inputs at signal level and then analyzing the combined result, and a method of analyzing respective modality inputs and then combining the analyzed results at meaning level.

The method of combining multimodal inputs at signal level involves the immediate combining, analyzing and classifying multimodal input signals, and may be used to process signals that are simultaneously generated, for example, a voice signal and a signal regarding movement of the lips. However, the method has a disadvantage in that since two or more signals have to be integrated and processed, a very large characteristic space is required, a very complicated model is needed to perceive the relationship between the signals and accordingly the amount of learning required for the model is high. Also, since the method does not have good expandability, it is not easy to combine the method with other modalities or to apply it to other terminals.

The method of combining modality inputs at meaning level involves analyzing the meaning of each modality input signal and then combining the results of the analysis. The method has advantages in learning and expansion since independencies between modalities are maintained. However, a user uses multimodal inputs because there are associations between modalities, and analyzing the meanings of multimodal inputs individually makes finding such associations difficult.

SUMMARY

The following description relates to an apparatus and method for deducing a user's is intention efficiently and accurately by predicting the user's intention based on motion information and deducing the predicted user's intention based on multimodal information.

In one general aspect, there is provided a user's intention deduction apparatus including a first predictor to predict a part of a user's intention using at least one piece of motion information, and a second predictor to predict the user's intention using the part of the user's intention predicted by the first predictor and multimodal information received from at least one multimodal sensor.

The first predictor may generate a control signal for executing an operation to be performed when predicting the user's intention using the predicted part of the user's intention.

The control signal may control an operation of the multimodal sensor which is controlled by the user's intention deduction apparatus.

The second predictor may interpret the multimodal information received from the multimodal sensor in association with the predicted part of the user's intention to predict the user's intention.

When the predicted part of the user's intention is an intention of selecting an object displayed on a display screen and voice is input from the multimodal sensor, the second predictor may interpret the voice in association with the intention of selecting the object, predicting the user's intention.

The second predictor may predict the user's intention using multimodal information received from at least one multimodal sensor within a range of the predicted part of the user's intention.

When the predicted part of the user's intention is an operation of moving a microphone close to the user's mouth, the second predictor may sense a sound signal and extract and analyze characteristics of the sound signal, predicting the user's intention.

The second predictor may detect a voice section from the sound signal, and predict, if detecting a voice section from the sound signal, the user's intention as a voice instruction input.

The second predictor may predict, when detecting breath sound, the user's intention as a blow.

When the predicted part of the user's intention is to select an object displayed on a display screen, the second predictor may predict the user's intention as at least one of deletion, classification and arrangement of the selected object using multimodal information.

The user's intention deduction apparatus may further include a user's intention applying unit to control software or hardware using the predicted results of the user's intention.

In another general aspect, there is provided a user's intention deduction method including: receiving at least one piece of motion information; predicting a part of a user's intention using the received motion information; receiving multimodal information from at least one multimodal sensor; and predicting the user's intention using the predicted part of the user's intention and the multimodal information.

Other objects, features and advantages will be apparent from the following description, the drawings, and the claims.

DETAILED DESCRIPTION

The detailed description is provided to assist the reader in gaining a comprehensive understanding of the methods, apparatuses and/or systems described herein. Various changes, modifications, and equivalents of the systems, apparatuses, and/or methods described herein will likely suggest themselves to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions are omitted to increase clarity and conciseness.

Figure 1:
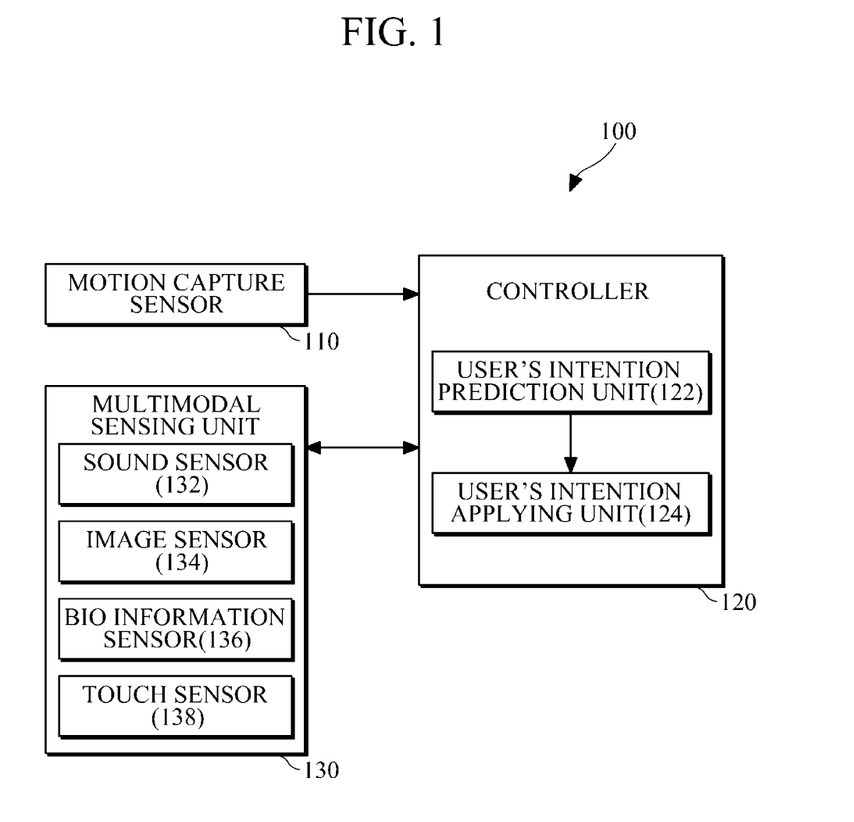
FIG. 1 is a diagram illustrating an example of a user's intention deduction apparatus.

FIG. 1 is a diagram illustrating an example of a user's intention deduction apparatus 100.

Referring to FIG. 1, the user's intention deduction apparatus 100 includes a motion capture sensor 110, a controller 120, and a multimodal sensing unit 130. The user's intention deduction apparatus 100 may be an arbitrary device or system, such as a cellular phone, a is personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like. Also, the user's intention deduction apparatus 100 may further include various components, such as a user interface, a display, a sound output unit, a multimodal interface, and so on. This is a non-exhaustive, nonlimiting list.

The motion capture sensor 110 may include an inertia sensor which senses a user's motion, a terrestrial magnetism sensor which senses a user's direction and an acceleration or gyro sensor which senses a user's movement. In addition, the motion capture sensor 110 may include an image sensor, a sound sensor and so on. According to an example embodiment, a plurality of motion capture sensors may acquire information about a user's motion by attaching the motion capture sensors on the user's body parts and the user's intention deduction apparatus 100.

The multimodal sensing unit 130 may include one or more multimodal sensors 132, 134, 136, 138. The multimodal sensors may include a sound sensor 132 for sensing sound signals, an image sensor 134 for sensing image information, a bio information sensor 136 for sensing bio information such as one's temperature, and a touch sensor 138 for sensing a touch gesture on a touch pad. However, these sensors are only example and any other types of multimodal sensors may be used.

Also, although the example in FIG. 1 shows four sensors, the number of sensors used is not limited. The kinds of sensors that can be included in the multimodal sensing unit 130 may be more various than the kinds of sensors that can be included in the motion capture sensor 110 aiming at sensing motions. Also, the motion capture sensor 110 and the multimodal sensing unit 130, which are drawn in FIG. 1 to be separated from each other, may be integrated into one body. In addition, the motion sensor 110 and the multimodal sensing unit 130 may include the same kinds of sensors, for example, an image sensor and a sound sensor.

The multimodal sensing unit 130 may include a module which extracts characteristic values from multimodal information sensed by the multimodal sensors 132, 134, 136, 138 according to the types of the multimodal information and interprets the characteristic values. The module may be included in the controller 120.

The controller 120 may include applications, data and an operating system for controlling the operations of respective components of the user's intention deduction apparatus 100. According to an example embodiment, the controller 120 may include a user's intention prediction unit 122 and a user's intention applying unit 124.

The user's intention prediction unit 122 may receive at least one piece of motion information sensed by the motion capture sensor 110 and may predict a part of a user's intention based on the motion information. Also, the user's intention prediction unit 122 may then predict the user's intention using the predicted part of the user's intention and multimodal information received from at least one multimodal sensor 132, 134, 136, 138. That is, the user's intention prediction unit 122 may predict, the user's intention based on motion information sensed by the motion capture sensor 110 and multi-modal information sensed by the multimodal sensing unit 110. The user's intention prediction unit 122 may deduce the user's intention using one of various known deduction models.

Also, the user's intention prediction unit 122 may generate a control signal for executing an operation to be performed to predict the user's intention using the previously predicted part of the user's intention. The control signal may be a signal for controlling the operation of the multimodal sensing unit 130.

For example, it may be possible to activate some sensors associated with the predicted is part of the user's intention, among the sensors 132, 134, 136, 138 of the multimodal sensing unit 130, based on the predicted part of the user's intention. In this example, power consumption may be reduced compared to the example of activating all sensors 132, 134, 136, 138 of the multimodal sensing unit 130. Also, since a relatively small amount of sensing information received from the associated sensors is analyzed, interpretation of multimodal information may be simplified, and more accurate deduction on the user's intention may be achieved while lowering complexity in the process of predicting the user's intention.

The user's intention predicting unit 122 may include a module (not shown) which extracts and analyzes characteristics according to the types of multimodal information to predict the user's intention. Also, the user's intention prediction unit 122 may interpret multimodal information sensed by the multimodal sensing unit 130 in association with the predicted part of the user's intention.

For example, if the user's intention prediction unit 122 may determine that the predicted part of the user's intention is an attempt to select objects displayed on a display screen, the user's intention prediction unit 122 may interpret, when voice is sensed by the multimodal sensing unit 130, the sensed voice in association with an attempt to select objects, and predict the user's intention. In detail, if the predicted part of the user's intention is determined as an attempt to select objects displayed on a display screen and a voice signal sensed by the multimodal sensing unit 130 instructs "arrange in date order," the user's intention prediction unit 122 may interpret the user's intention as "arrange objects selected on a display screen in date order."

Also, when the user's intention prediction unit 122 determines that the predicted part of the user's intention is an attempt to select objects displayed on a display screen, the user's intention prediction unit 122 may predict the user's intention as at least one of deletion, classification, and arrangement of the selected objects using multimodal information.

The user's intention applying unit 124 may control software or hardware, which is under the control of the user's intention deduction apparatus 100, using the predicted results of the user's intention. The user's intention applying unit 124 may provide a multimodal interface to interact with a predicted user's intention. For example, if the user's intention is predicted as issuing a voice instruction, the user's intention applying unit 124 may perform voice recognition to perceive the meaning of the voice instruction and execute an application of automatically calling a specific person or a search application according to the results of the recognition, and may execute, if the user's intention is to transmit an object selected by the user, an e-mail application. As another example, if the user's intention is predicted as humming, an application of searching for music similar to humming sound may be executed. As another example, when the user's intention is predicted as a blow, the user's intention may be used as an instruction for causing an avatar in a game application to execute a particular operation.

According to an example embodiment, by predicting a part of a user's intention through recognition of the user's motion and analyzing multimodal information according to the predicted part of the user's intention to predict the user's intention, multimodal information may be interpreted in association with the predicted part of the user's intention while maintaining independency in analyzing the multimodal information, and accordingly, the relationship between modalities can be easily perceived, resulting in accurate prediction on the user's intention.

Figure 2:
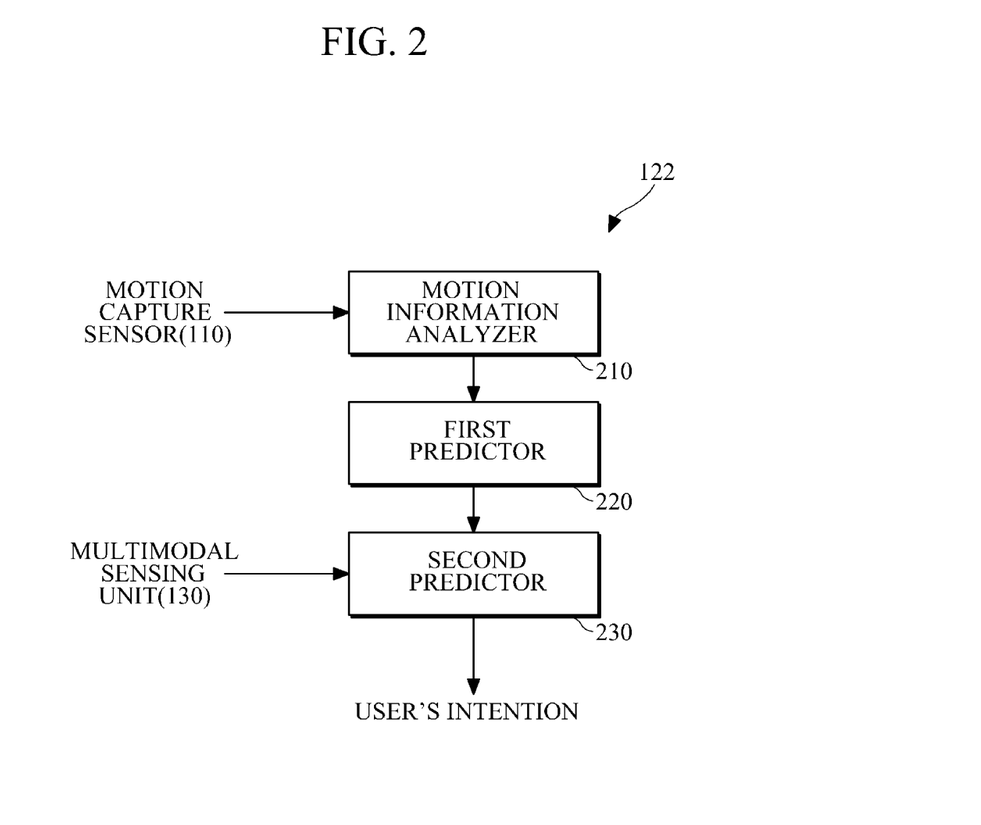
FIG. 2 is a diagram illustrating an example of a user's intention prediction unit of FIG. 1.

FIG. 2 is a diagram illustrating an example of the user's intention prediction unit 122 of FIG. 1.

The user's intention prediction unit 122 may include a motion information analyzer 210, a first predictor 220, and a second predictor 230.

The motion information analyzer 210 may analyze at least one piece of motion is information received from the motion capture sensor 110. The motion information analyzer 210 may predict information regarding the locations and angles of the user's body parts on which motion capture sensors 110 are attached, by analyzing motion information, and may also predict information regarding the locations and angles of the user's body parts on which no motion capture sensor is attached using the predicted location and angle information.

For example, when the motion capture sensors 110 (see FIG. 1) are attached on both wrists and head, the distance between the motion capture sensors 110 may be measured and each sensor can acquire information regarding 3-dimensional rotation angles with respect to a reference coordinate system. In this example, by calculating the distances between the wrist parts and head part, and rotation angles of the wrists based on motion information, the distances between the hands and mouth of the head and information regarding the rotation angles of the wrists may be determined. If a user holds a microphone which corresponds to the sound sensor 132 of the user's intention deduction apparatus 100, the distance between the microphone and the user's mouth and the direction of the microphone may be calculated.

As another example, when the motion capture sensors 110 are attached on a user's head and a microphone corresponding to the sound sensor 132, the distance between the microphone and the user's head may be measured based on motion information, and information regarding a 3-dimensional angle to an axis at which the motion capture sensor 110 attached on the microphone is placed may be acquired by an inertia sensor attached on the microphone, so that the motion information analyzer 210 may calculate information regarding the distance between the wrist and the user's mouth, and a rotation angle of the microphone.

As another example, an image sensor may be included in the motion sensor 110 to provide image information to the motion information analyzer 210. In this example, the motion information analyzer 210 may recognize objects, such as faces or hands, in images and then calculate the positional relationship between the objects. For example, the motion information analyzer 210 may calculate the distance and angle between a face and two hands, and the distance and angle between the two hands, etc.

The first predictor 220 may predict a part of the user's intention triggered through analysis of motion information. For example, the first predictor 220 may analyze motion information including images to predict whether a part of the user's intention is a motion to select an object displayed on a screen.

The second predictor 230 may predict the user's intention using the part of the user's intention predicted by the first predictor 220 and multimodal information received from the multimodal sensing unit 130.

In order to interpret the user's intention, the second predictor 230 may interpret multimodal information received from the multimodal sensing unit 130 in association with the part of the user's intention predicted by the first predictor 220. For example, if the predicted part of the user's intention is to select an object displayed on a display screen, the second predictor 230 may interpret, when receiving voice from the multimodal sensing unit 120, the received voice in association with the user's intention trying to select the object, predicting the user's intention.

As another example, the first predictor 220 may predict the part of the user's intention as a motion of moving a microphone close to the user's mouth, and the second predictor 230 may predict the user's intention of inputting a voice instruction, when sensing a movement of the user's mouth through the image sensor 134 (see FIG. 1), such as a camera, and receiving voice through the sound sensor 132, such as the microphone. In order to predict the user's intention for inputting a voice instruction, the second predictor 230 may detect a voice section from a sound signal, extract characteristics of the detected voice section, and then analyze the meaning of the voice section through its characteristic analysis, converting the voice section into a format that is usable by the user's intention applying unit 124.

As another example, the first predictor 220 may predict a motion of moving a microphone close to a user's mouth as a part of the user's intention, and the second predictor 230 may predict, when the multimodal sensing unit 130 continues to sense an image showing the user's mouth protruding out through the image sensor 134, such as a camera, and a breath sound is received through the microphone, the user's intention as a blow.

In the above-described two examples, two different user's intentions of "move a microphone close to a mouth and input a voice instruction" and "move a microphone close to a mouth and blow at the microphone" are predicted. However, the two user's intentions have a common part of "move a microphone close to a mouth" and the first predictor 220 predicts such a part of the user's intentions, limiting a range of the user's intention to be determined. Within the range of the user's intention limited by the first predictor 220, the second predictor 230 may predict the user's intention in consideration of multimodal information. Considering the above-described two examples, when a motion of "moving a microphone close to a mouth" is sensed, the first predictor 220 may limit a range of a user's intention to "input a voice instruction" and "blow" and the second predictor 230 may determine whether the user's intention is to "input a voice instruction" or to "blow" in consideration of sensed multimodal information.

Figure 3:
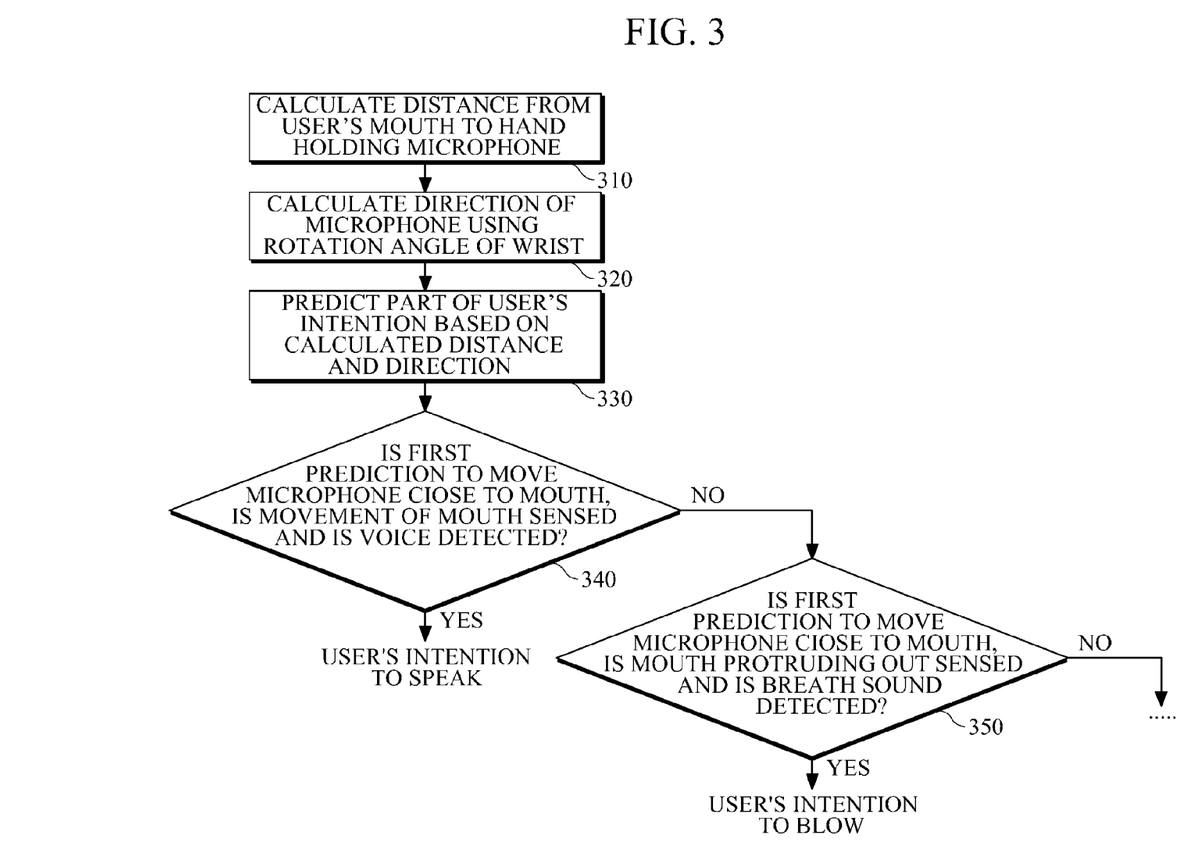
FIG. 3 is a flowchart illustrating an example of an operation of the user's intention prediction unit of FIG. 2.

FIG. 3 is a flowchart illustrating an example of an operation of the user's intention prediction unit 122 shown in FIG. 2.

Referring to FIGS. 1, 2, and 3, the first predictor 220 may predict a part of a user's intention using motion information analyzed by the motion information analyzer 210. The second predictor 230 may receive a multimodal signal, such as an image sensed by the image sensor 134 of the multimodal sensing unit 130 or a sound signal sensed by the sound sensor 132, and create information on whether any voice is detected, predicting the user's intention based on the created information.

As an example, the motion information analyzer 210 may calculate a distance between the user's mouth and hand holding a microphone, using motion information sensed by motion capture sensors attached on the user's head and wrist (operation 310). The motion information analyzer 210 may calculate a direction of the microphone based on a rotation angle of the user's wrist (operation 320).

The first predictor 220 may predict whether the user tries to move the microphone close to the mouth, using the distance and direction information, and predicts a part of the user's intention (operation 330). For example, if the user's hand is within 20 cm from the user's mouth and the microphone faces the user's mouth, the first predictor 220 may determine that the user intends to move the microphone close to the user's mouth.

In this example, the second predictor 230 may analyze multimodal input signals received from the sound sensor 132, such as a microphone, and from the image sensor 134, such as a camera, to predict the user's intention as an intention of issuing a voice instruction or as an intention of humming or blowing, etc.

When the predicted part of the user's intention, that is, the first prediction is to move a microphone close to a mouth, a movement of the user's mouth is sensed by the camera and voice is detected from a sound signal sensed by the microphone, the second predictor 230 may predict the user's intention as an intention of issuing a voice instruction (operation 340). Unlike this, when the first prediction is to move a microphone close to a mouth, an image showing the user's mouth protruding out is sensed by the camera, and a breath sound is detected from a sound signal received from the microphone, the second predictor 230 may determine the user's intention as an intention of blowing (operation 350).

Figure 4A:
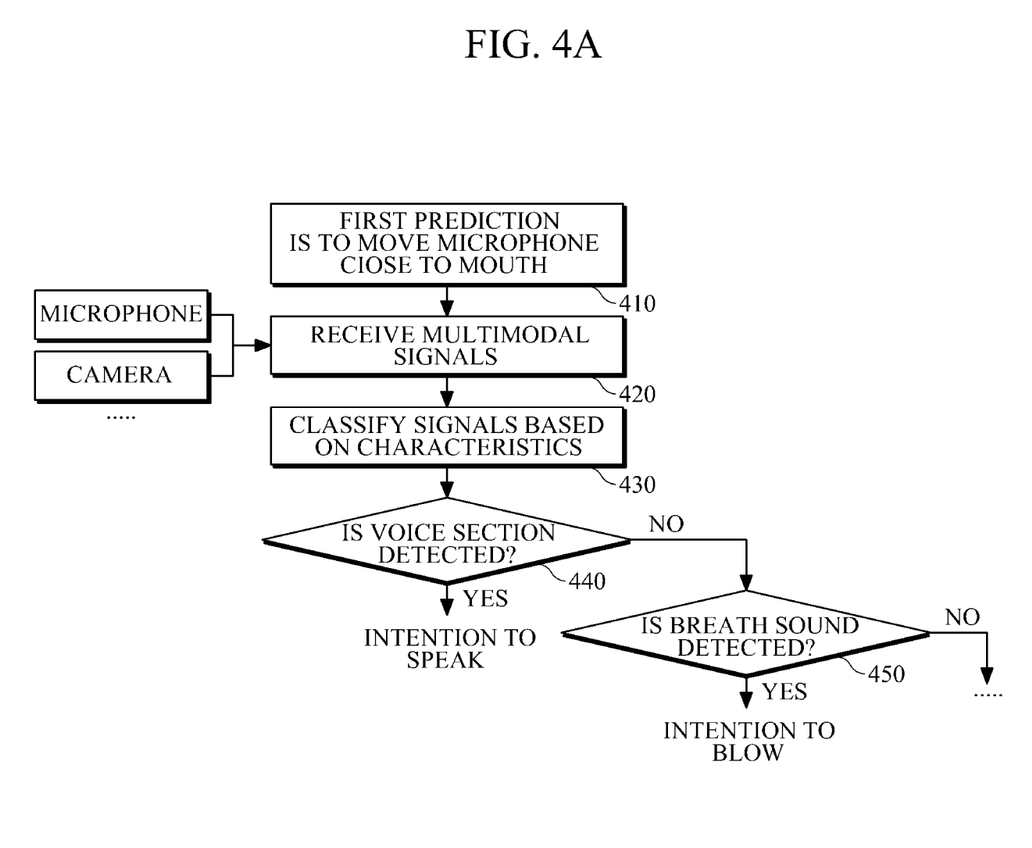
FIG. 4A is a flowchart illustrating an example of an operation of predicting a part of a user's intention and then predicting the user's intention using received multimodal information.

FIG. 4A is a flowchart illustrating an example of an operation of predicting a part of a user's intention and then predicting the user's intention using received multimodal information.

When the first predicted part of the user's intention received from the first predictor 220 is to move a microphone close to a mouth (operation 410), the second predictor 230 may activate sensors, such as a microphone and a camera, included in the multimodal sensing unit 130, and receive multimodal signals (operation 420).

Then, the second predictor 230 may extract characteristics from a sound signal received from the microphone and an image signal received from the camera, and may classify and analyze the characteristics (operation 430).

For example, time domain characteristics (e.g., time energy, frequency energy, zero crossing rate, linear predictive coding (LPC), cepstral coefficients, pitch, etc.), or statistical characteristics (e.g., frequency spectrum) may be extracted from the sound signal received from the microphone. Extractable characteristics may be not limited to these examples, and any other characteristics may be extracted by different algorithms. The extracted characteristics may be classified into a speech class or a non-speech class using a classification and learning algorithm, such as a decision tree, a support vector machine, a Bayesian Network, a neural network, etc. However, the extracted characteristics may be not limited to these examples.

If a voice section is detected in operation 440, the second predictor 230 may predict the user's intention as a voice instruction input. If no voice section is detected in operation 440, and a breath sound is detected as the results of the characteristic analysis in operation 450, the second predictor 230 may predict the user's intention as an intention of blowing. It will be apparent to those skilled in the art that detection of different types of characteristics decides the user's intention as one of various intentions such as humming. The second predictor 230 may predict the user's intention within a user's intention range limited by the first prediction.

Accordingly, according to an example embodiment, since a user's intention is predicted using multimodal information of the user, and voice detection is controlled according to the results of the prediction, the user may input his or her voice intuitively without having to learn a voice input method, for example, pressing a button or touching a screen for inputting voice or the like, upon use of a voice interface.

The second predictor 230 may detect a voice section by using at least one of image information received from the image sensor 134 such as a camera, and at least one piece of sensed information which is changed when a person speaks, as well as sound information from the microphone, together with characteristic information extracted from the sound signal. The second predictor 230 may then process voice included in the detected voice section. For example, the sensed information may be at least one piece among image information representing a change in the user's mouth shape, temperature information representing a change in temperature due to breath, etc., emitted when speaking; vibration information representing throat vibration, jaw vibration, etc., occurring when speaking; and sensed information of infrared ray irradiated from the user's face or mouth when speaking.

If a voice section is detected in operation 440, the user's intention applying unit 124 may process a voice signal belonging to the detected voice section and perform voice recognition, and convert an application module using the result of the voice recognition. For example, if an application is executed according to the result of the voice recognition and a name is identified, intelligent voice input start or termination conversion, such as searching for a telephone number corresponding to the identified name or making a call with the found telephone number, may be allowed. Also, if the user's intention deduction apparatus 100 is a mobile communication device, by perceiving an intention to start or terminate a voice call based on multimodal information, mode conversion into a voice call mode can be performed without having to perform an operation such as pressing a call button.

Figure 4B:
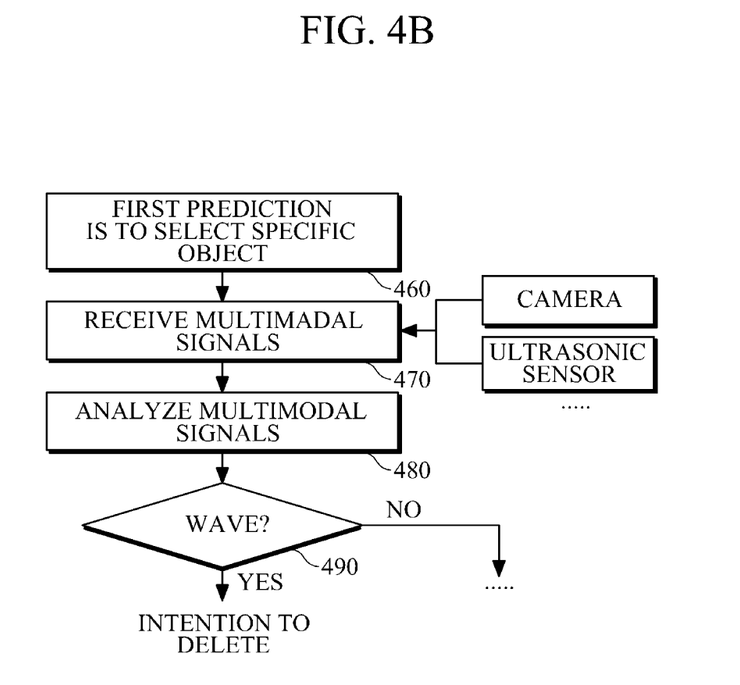
FIG. 4B is a flowchart for explaining another example of an operation of predicting a part of a user's intention and then predicting the user's intention using received multimodal information.

FIG. 4B is a flowchart for explaining another example of an operation of first predicting a part of a user's intention, and then second predicting the user's intention using received multimodal information.

When a first predicted part of the user's intention received from the first predictor 220 is to select a specific object (operation 460), the second predictor (see FIG. 2) activates sensors, such as a camera, a ultrasonic sensor, etc., to receive a multimodal signal (operation 470).

Then, the second predictor 230 analyzes the multimodal signal to predict the user's intention. For example, the user's intention may be one of those that are within a range limited by the first prediction.

The second predictor 230 may determine the user's intention as a motion of waving based on the results of the analysis on the multimodal signal (operation 490). The second predictor 230 may interpret the motion of waving as an intention of deleting a specific item or file displayed on a screen, causing the user's intention applying unit 224 to delete the specific item or file.

Figure 5:
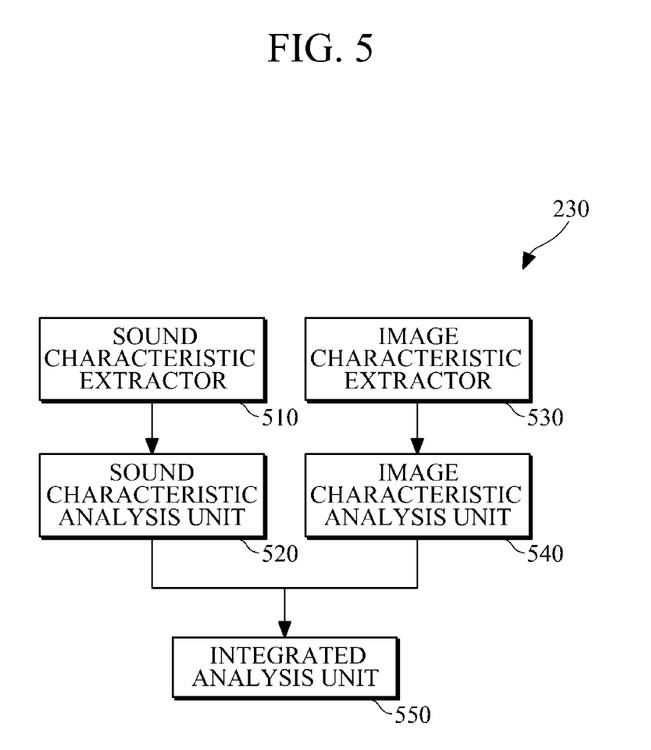
FIG. 5 illustrates an example of a configuration for combining sound signals with image signals to classify signals.

FIG. 5 illustrates an example of characteristic-based signal classification by which the second predictor 230 uses sound signals and image signals together to perform integrated analysis.

The second predictor 230 may include a sound characteristic extractor 510, a sound characteristic analysis unit 520, an image characteristic extractor 530, an image characteristic analysis unit 540, and an integrated analysis unit 550.

The sound characteristic extractor 510 may extract sound characteristics from a sound signal. The sound characteristic analysis unit 520 may extract a voice section by applying a classification and learning algorithm to sound characteristics. The image characteristic extractor 530 may extract image characteristics from a series of image signals. The image characteristic extractor 540 may extract a voice section by applying a classification and learning algorithm to the extracted image characteristics.

The integrated analysis unit 550 may integrate results classified respectively from the sound signals and image signals, finally detecting a voice section. For example, it may be possible to individually apply sound characteristics and image characteristics or to apply both characteristics after integrating them, and if the characteristics of other signals, for example, signals representing vibration, temperature, etc., may be extracted and analyzed, the integrated analysis unit 550 may integrate the analyzed characteristics with the information extracted from the sound signal and image signal, detecting a voice section.

According to an example embodiment, a user can input his or her voice intuitively without having to learn a voice input method for using a voice interface. For example, a user may not need to perform operations, such as pressing a button to input voice, touching a screen, etc. Also, it may be possible to accurately detect a user's voice in various noise environments regardless of the types or degrees of noise, including home noise, vehicle noise, and noise of other people. Furthermore, since voice can be detected using bio information as well as image information, a user's voice may be accurately detected even under too bright or dark lighting or even when the user covers his or her mouth with hands.

Figure 6:
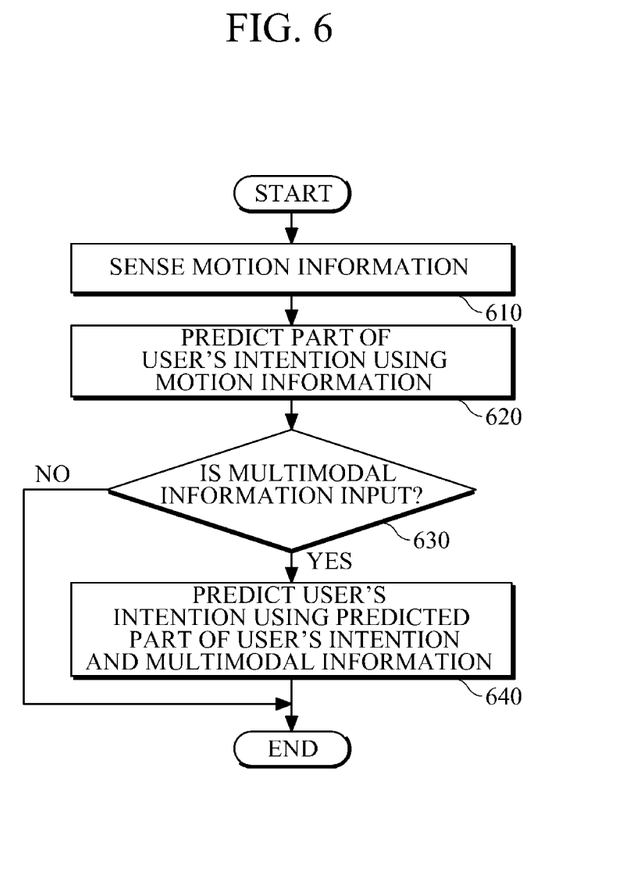
FIG. 6 is a flowchart illustrating an example of a method of deducing a user's intention based on multimodal information.

FIG. 6 is a flowchart illustrating an example of a method of deducing a user's intention based on multimodal information.

The user's intention deduction apparatus 100 may receive motion information sensed by at least one motion capture sensor (operation 610). The user's intention deduction apparatus 100 may first predict a part of the user's intention using the received motion information (operation 620).

If multimodal information sensed by at least one multimodal sensor is received (operation 630), the user's intention deduction apparatus 100 may then predict the user's intention using the predicted part of the user's intention and the multimodal information (operation 640). When predicting the user's intention, an operation of interpreting multimodal information sensed by the multimodal sensor in association with the predicted part of the user's intention may be performed.

A control signal may be generated to execute operation of predicting the user's intention using the predicted part of the user's intention. The control signal may be a signal for controlling the operation of multimodal sensors which are under the control of the user's intention deduction apparatus 100. The user's intention may be determined using multimodal information received from at least one multimodal sensor, within a range of the predicted part of the user's intention.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A user's intention deduction apparatus, comprising:
a detector configured to generate motion information based upon detected motion of a user;
a first predictor configured to predict a part of the user's intention using the motion information; and
a second predictor configured to predict the user's intention using the part of the user's intention predicted by the first predictor and multimodal information received from at least one multimodal sensor, wherein
the first predictor predicts the part of the user's intention to be the selection of an object displayed by a screen based upon an angle and a distance between the user's two hands.

2. The user's intention deduction apparatus of claim 1, wherein the first predictor is further configured to generate a control signal for executing an operation to be performed when predicting the user's intention using the predicted part of the user's intention.

3. The user's intention deduction apparatus of claim 2, wherein the control signal is configured to control operation of the multimodal sensor which is controlled by the user's intention deduction apparatus.

4. The user's intention deduction apparatus of claim 1, wherein the second predictor is further configured to interpret the multimodal information received from the multimodal sensor in association with the predicted part of the user's intention to predict the user's intention.

5. The user's intention deduction apparatus of claim 4, wherein, in response to the predicted part of the user's intention being an intention of selecting an object displayed on a display screen and voice being input from the multimodal sensor, the second predictor is further configured to interpret the voice in association with the intention of selecting the object to predict the user's intention.

6. The user's intention deduction apparatus of claim 1, wherein the second predictor is further configured to predict the user's intention using the multimodal information received from the at least one multimodal sensor, within a range of the predicted part of the user's intention.

7. The user's intention deduction apparatus of claim 6, wherein, in response to the predicted part of the user's intention being an operation of moving a microphone close to the user's mouth, the second predictor is further configured to:
sense a sound signal; and
extract and analyze characteristics of the sound signal to predict the user's intention.

8. The user's intention deduction apparatus of claim 7, wherein the second predictor is further configured to:
detect a voice section from the sound signal; and
predict, in response to detecting the voice section from the sound signal, the user's intention as a voice instruction input.

9. The user's intention deduction apparatus of claim 8, wherein the second predictor is further configured to predict, in response to detecting breath sound from the sound signal, the user's intention as a blow.

10. The user's intention deduction apparatus of claim 1, wherein, in response to the predicted part of the user's intention being to select an object displayed on a display screen, the second predictor is further configured to predict the user's intention as at least one of deletion, classification, and arrangement of the selected object using the multimodal information.

11. The user's intention deduction apparatus of claim 1, further comprising a user's intention applying unit configured to control software or hardware that is under control of the user's intention deduction apparatus using the prediction of the user's intention.

12. A user's intention deduction method, comprising:
receiving motion information;
predicting a part of a user's intention using the received motion information;
receiving multimodal information from at least one multimodal sensor; and
predicting the user's intention using the predicted part of the user's intention and the multimodal information, wherein
the part of the user's intention is predicted to be the selection of an object displayed by a screen based upon an angle and a distance between the user's two hands.

13. The user's intention deduction method of claim 12, further comprising generating a control signal for executing an operation to be performed when predicting the user's intention using the predicted part of the user's intention.

14. The user's intention deduction method of claim 13, wherein the control signal controls the operation of the multimodal sensor.

15. The user's intention deduction method of claim 12, wherein the predicting of the user's intention comprises interpreting the multimodal information received from the multimodal sensor in association with the predicted part of the user's intention.

16. The user's intention deduction method of claim 12, wherein the user's intention is predicted using the multimodal information received from the at least one multimodal sensor, within a range of the predicted part of the user's intention.

17. The user's intention deduction method of claim 12, further comprising controlling software or hardware using the prediction of the user's intention.

18. The apparatus of claim 11, wherein the first predictor further predicts the part of the user's intention to be the selection of the object displayed by the screen based upon an angle and a distance between the user's face and two hands.

19. The method of claim 12, wherein the part of the user's intention is further predicted to be the selection of the object displayed by the screen based upon an angle and a distance between the user's face and two hands.

* * * * *